(12) United States Patent
Tejima et al.

(10) Patent No.: US 10,738,658 B2
(45) Date of Patent: Aug. 11, 2020

(54) AXIAL FLOW TURBINE

(71) Applicant: Toshiba Energy Systems & Solutions Corporation, Kawasaki-shi (JP)

(72) Inventors: Tomohiro Tejima, Yokohama (JP); Tsuguhisa Tashima, Yokohama (JP); Norikazu Takagi, Kawasaki (JP); Shogo Iwai, Yokohama (JP)

(73) Assignee: Toshiba Energy Systems & Solutions Corporation, Kawasaki-shi (JP)

( * ) Notice: Subject to any disclaimer, the term of this patent is extended or adjusted under 35 U.S.C. 154(b) by 245 days.

(21) Appl. No.: 15/956,825

(22) Filed: Apr. 19, 2018

(65) Prior Publication Data

US 2018/0238194 A1 Aug. 23, 2018

Related U.S. Application Data

(63) Continuation of application No. PCT/JP2015/005348, filed on Oct. 23, 2015.

(51) Int. Cl.
*F01D 25/26* (2006.01)
*F01D 25/14* (2006.01)
(Continued)

(52) U.S. Cl.
CPC .......... *F01D 25/26* (2013.01); *F01D 25/12* (2013.01); *F01D 25/14* (2013.01); *F02C 3/34* (2013.01); *F05D 2220/31* (2013.01)

(58) Field of Classification Search
CPC ........ F01D 25/26; F01D 25/12; F01D 25/285; F05D 2220/31; F02C 7/16; F02C 3/34
See application file for complete search history.

(56) References Cited

U.S. PATENT DOCUMENTS 4,550,569 A * 11/1985 Isa .................. F01D 25/26
415/176

FOREIGN PATENT DOCUMENTS

JP 58-126404 7/1983
JP 58126404 A * 7/1983 ............. F01D 25/26
(Continued)

OTHER PUBLICATIONS

International Search Report dated Jan. 26, 2016 in PCT/JP2015/005348 filed Oct. 23, 2015 (with English Translation).
(Continued)

*Primary Examiner* — Richard A Edgar
(74) *Attorney, Agent, or Firm* — Oblon, McClelland, Maier & Neustadt, L.L.P.

(57) ABSTRACT

An axial flow turbine according to an embodiment includes: an outer casing; an inner casing provided inside the outer casing; a discharge pipe that is welded and joined to the outer casing and through which a working fluid discharged from the axial flow turbine flows; a sleeve that is provided inside the outer casing and the discharge pipe and guides the working fluid discharged from the axial flow turbine to the discharge pipe; a tubular member that is provided over an outer periphery of the sleeve inside the outer casing and the discharge pipe and covers an inner periphery side of a joint portion between the outer casing and the discharge pipe; an introduction port that introduces a cooling medium into a space demarcated by the outer casing, the discharge pipe, and the tubular member; and a discharge port that discharges the cooling medium introduced into the space.

14 Claims, 8 Drawing Sheets

(51) Int. Cl.
*F01D 25/12* (2006.01)
*F02C 3/34* (2006.01)

(56) References Cited

FOREIGN PATENT DOCUMENTS

| | | |
|---|---|---|
| JP | 58-174106 A | 10/1983 |
| JP | 59-229003 A | 12/1984 |
| JP | 61-004804 | 1/1986 |
| JP | 07-158408 | 6/1995 |
| JP | 08-277703 | 10/1996 |
| JP | 10-266806 | 10/1998 |
| JP | 11-229817 A | 8/1999 |
| JP | 2010-255542 | 11/2010 |

OTHER PUBLICATIONS

Written Opinion dated Jan. 26, 2016 in PCT/JP2015/005348 filed Oct. 23, 2015.

\* cited by examiner

AXIAL FLOW TURBINE

CROSS-REFERENCE TO RELATED APPLICATIONS

This application is a continuation of prior International Application No. PCT/JP2015/005348 filed on Oct. 23, 2015; the entire contents of all of which are incorporated herein by reference.

FIELD

Embodiments described herein generally relate to an axial flow turbine.

BACKGROUND

From the viewpoint of an improvement in turbine efficiency, an increase in temperature of a working fluid at the entrance of an axial flow turbine has been achieved. For example, in an axial flow turbine into which a working fluid having a temperature of 630° C. or higher is introduced and in an axial flow turbine from which a working fluid having a temperature of 630° C. or higher is discharged, a casing, a pipe, and the like, which are to be exposed to this high-temperature working fluid, are formed of a high-strength material such as an Ni-based alloy, which can endure the temperature of the working fluid.

Examples of a conventional axial flow turbine include one in which an outer casing is formed to cover an exhaust hood, for example. Such a formation requires the entire outer casing to be formed of a high-strength material. However, it is difficult for a large-sized cast product such as the outer casing to be formed of a high-strength material. Further, even if the large-sized cast product is manufactured of a high-strength material, it is difficult to maintain its quality.

Thus, a double-casing structure in which an inner casing surrounds the periphery where a high-temperature working fluid flows and an outer casing surrounds the periphery of the inner casing is employed. Then, the inner casing is formed of a high-strength material, and the outer casing is formed of a conventional product such as high Cr steel or low Cr steel.

In the axial flow turbine having such a double-casing structure, a double-pipe structure is employed in a path where a high-temperature working fluid is introduced into the axial flow turbine and a path where the high-temperature working fluid is discharged from the axial flow turbine. This double-pipe structure includes a short pipe formed of a high-strength material, which is welded and joined to the outer casing, and a sleeve formed of a high-strength material, which couples the short pipe and the inner casing. The high-temperature working fluid flows through between the short pipe and the inner casing via the sleeve without coming into contact with the outer casing.

A joint portion between the short pipe and the outer casing increases in temperature due to thermal radiation from the sleeve and heat conduction from the short pipe. When the temperature of the joint portion becomes higher than a predetermined temperature, a required strength in the joint portion cannot be maintained. Further, in the joint portion made by dissimilar welding of the high-strength material such as an Ni-based alloy and the conventional product, a strength reduction of a weld heat affected zone and a strength reduction due to an effect of carbon diffusion are significant. Therefore, it is necessary to maintain the temperature of the joint portion to an allowable temperature or lower.

In the conventional axial flow turbine, a technique in which a cooling fluid is introduced between the short pipe and the sleeve to cool the short pipe and the joint portion made by welding the short pipe and the outer casing is under consideration. In this conventional axial flow turbine, the temperature of the working fluid flowing through the sleeve is lower than 630° C. Further, the difference in temperature between the working fluid flowing through the sleeve and the cooling fluid is small. Therefore, even when the cooling fluid directly comes into contact with the sleeve, an effect of thermal stress is not a problem.

As described previously, the working fluid to be introduced into the axial flow turbine is increased in temperature. In the meantime, the high-temperature working fluid is sometimes discharged from the axial flow turbine. Therefore, the difference in temperature between the cooling fluid and the sleeve increases. Thereby, like the technique of cooling the joint portion in the conventional axial flow turbine, direct contact of the cooling fluid with the sleeve causes a large thermal stress.

DETAILED DESCRIPTION

An axial flow turbine of one embodiment includes: an outer casing; an inner casing provided inside the outer casing; a turbine rotor provided in the inner casing so as to penetrate therethrough; rotor blades implanted in the turbine rotor; and stationary blades that are supported by a support member provided on an inner side of the inner casing and are disposed alternately with the rotor blades in a turbine rotor axial direction.

Further, the axial flow turbine further includes: a working fluid discharge pipe that is welded and joined to the outer casing and through which a working fluid discharged from the axial flow turbine flows; a tubular sleeve that is provided inside the outer casing and the working fluid discharge pipe and guides the working fluid discharged from the axial flow turbine to the working fluid discharge pipe; a tubular member that is provided over an outer periphery of the sleeve inside the outer casing and the working fluid discharge pipe and covers an inner periphery side of a welded joint portion between the outer casing and the working fluid discharge pipe; an introduction port that introduces a cooling medium into an annular space demarcated by the outer casing, the working fluid discharge pipe, and the tubular member; and a discharge port that discharges the cooling medium introduced into the annular space.

Hereinafter, there will be explained embodiments according to the present invention with reference to the drawings.

First Embodiment

Figure 1:
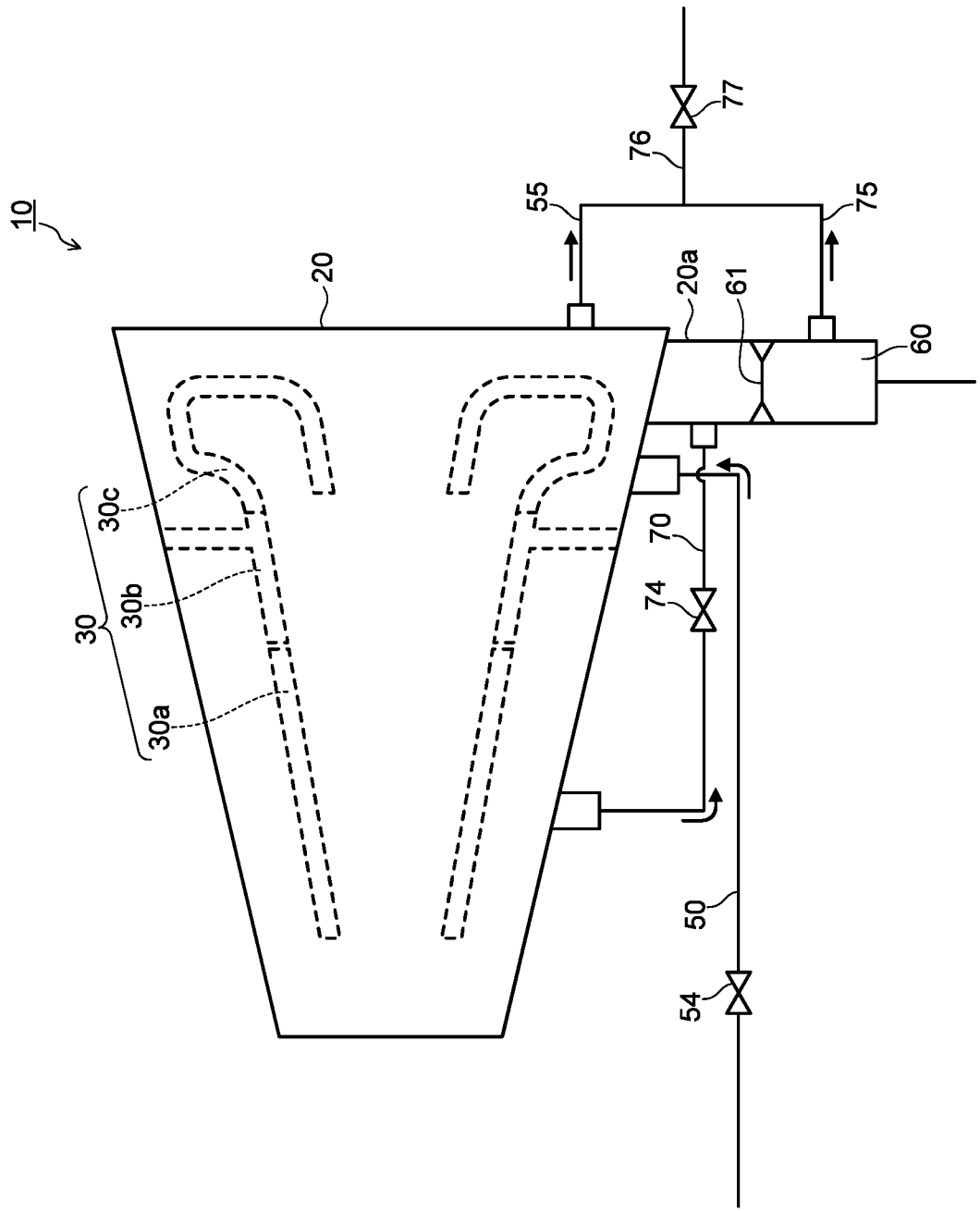
FIG. 1 is a view schematically illustrating cooling medium systems in an axial flow turbine in a first embodiment.

FIG. 1 is a view schematically illustrating cooling medium systems in an axial flow turbine 10 in the first embodiment. Examples of the axial flow turbine 10 illustrated in FIG. 1 include a gas turbine, a $CO_2$ turbine, and so on. In the $CO_2$ turbine, a part of carbon dioxide ($CO_2$) produced in a combustor is pressurized to be a supercritical fluid and is circulated in a system of a working fluid. The temperature of a working fluid to be discharged from the axial flow turbine 10 is greater than 630° C., for example.

As illustrated in FIG. 1, the axial flow turbine 10 includes an outer casing 20 and an inner casing 30 provided inside the outer casing 20. Here, the inner casing 30 includes inner casings 30a and 30b that surround turbine stages including stationary blades and rotor blades, for example, and an inner casing 30c that composes a part of an exhaust hood into which the working fluid having passed through the final turbine stage flows.

The axial flow turbine 10 includes an introduction pipe 50 that introduces a cooling medium between the inner casing 30c to increase in temperature and the outer casing 20, for example. The introduction pipe 50 is coupled to the outer casing 20, for example. The cooling medium is supplied into this introduction pipe 50 from a supply source (not illustrated). The inner casings 30a, 30b do not increase in temperature because the cooling medium intended for cooling the stationary blades flows through therein, for example.

As the cooling medium to be introduced into the introduction pipe 50, in the case of a gas turbine, for example, air extracted from a compressor, and so on can be cited, and in the case of a $CO_2$ turbine, for example, carbon dioxide to circulate, which is extracted from the system, and so on can be cited. The extracting is performed at a place where a medium having suitable temperature and pressure as the cooling medium can be obtained. In this manner, into the introduction pipe 50, for example, a medium extracted from the main system in the axial flow turbine 10 is supplied as the cooling medium.

Further, as illustrated in FIG. 1, a flow rate regulating valve 54 is provided in the introduction pipe 50. The flow rate regulating valve 54 regulates the flow rate of the cooling medium to be introduced between the outer casing 20 and the inner casing 30c through the introduction pipe 50. In other words, the flow rate regulating valve 54 regulates the pressure of the cooling medium to be introduced between the outer casing 20 and the inner casing 30c.

For example, the flow rate regulating valve 54 regulates the flow rate of the cooling medium to the most suitable flow rate based on the temperature of the outer casing 20 at startup, during operation, after a stop, and the like of the axial flow turbine 10. The flow rate regulating valve 54 functions as a flow rate regulator.

The cooling medium introduced between the outer casing 20 and the inner casing 30c from the introduction pipe 50 is discharged through a discharge pipe 55 as illustrated in FIG. 1. The discharge pipe 55 is coupled to the outer casing 20, for example.

As above, by the introduction pipe 50, the space between the outer casing 20 and the inner casing 30c, the discharge pipe 55, and the like, an outer casing cooling system that cools the outer casing 20 mainly is composed.

Further, the axial flow turbine 10 includes a discharge pipe 60 that is welded and joined to the outer casing 20 and through which the working fluid discharged from the axial flow turbine 10 flows. Here, on a lower half side of the outer casing 20 on a downstream side, for example, a tubular portion 20a extending downward is provided for the purpose of discharging the working fluid. The single tubular portion 20a, or a plurality of the tubular portions 20a are provided. The discharge pipe 60 is welded and joined to the tubular portion 20a of the outer casing 20, for example.

Figure 2:
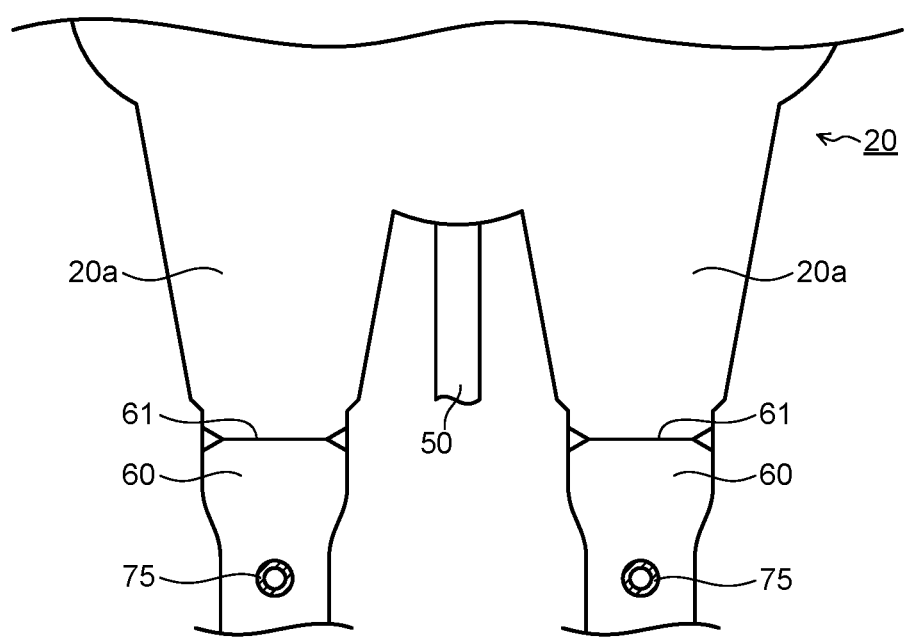
FIG. 2 is a plan view when the axial flow turbine in the first embodiment is seen from a downstream side.

FIG. 2 is a plan view when the axial flow turbine 10 in the first embodiment is seen from the downstream side. In this embodiment, the composition including the two tubular portions 20a is illustrated as an example. FIG. 1 illustrates a state where the tubular portion 20a on one side is seen and the tubular portion 20a on the other side is not seen.

In this case, as illustrated in FIG. 2, the two tubular portions 20a are formed in a bifurcated shape so as to sandwich a lowermost portion of the outer casing 20. Then, the tubular portions 20a are each provided to extend downward. The discharge pipes 60 are welded and joined to these tubular portions 20a respectively.

Internal constitutions of the tubular portion 20a of the outer casing 20 and the discharge pipe 60 will be described later. The discharge pipe 60 functions as a working fluid discharge pipe.

For example, an introduction pipe 70 that introduces a cooling medium to cool a joint portion 61 between the tubular portion 20a and the discharge pipe 60 from the inner side is coupled to the tubular portion 20a of the outer casing 20. Though not illustrated in FIG. 1, an introduction pipe 70 resulting from branching on a downstream side of a later-described flow rate regulating valve 74 is coupled to the tubular portion 20a on the other side as well. For example, a medium extracted from the turbine stages of the axial flow turbine 10 is supplied as the cooling medium into this introduction pipe 70.

As a supply source to supply the cooling medium into the introduction pipe 70, extracting from the turbine stages of the axial flow turbine 10 is described as an example here, but the supply source is not limited to this. The cooling medium to be supplied into the introduction pipe 70 only needs to be a medium having suitable temperature and pressure as the cooling medium. As above, for example, a medium extracted from any part of the main system in the axial flow turbine 10 is supplied into the introduction pipe 70 as the cooling medium.

The flow rate regulating valve 74 is provided in the introduction pipe 70 as illustrated in FIG. 1. The flow rate regulating valve 74 regulates the flow rate of the cooling medium to be introduced into the inside of the joint portion 61 through the introduction pipe 70. In other words, the flow rate regulating valve 74 regulates the pressure of the cooling medium to be introduced into the inside of the tubular portion 20a and the discharge pipe 60.

For example, the flow rate regulating valve 74 regulates the flow rate of the cooling medium to the most suitable flow rate based on the temperature of the joint portion 61 at startup, during operation, after a stop, and the like of the axial flow turbine 10. The flow rate regulating valve 74 functions as a flow rate regulator.

The cooling medium introduced into the inside of the tubular portion 20a and the discharge pipe 60 from the introduction pipe 70 is discharged through a discharge pipe 75 as illustrated in FIG. 1. The discharge pipe 75 is coupled to the discharge pipe 60, for example. As illustrated in FIG. 2, a discharge pipe 75 on the other side is also coupled to the discharge pipe 60 on the other side.

As above, a joint portion cooling system to cool the joint portion 61 is composed by the introduction pipe 70, the internal space of the tubular portion 20a and the discharge pipe 60, the discharge pipe 75, and the like.

One example where the introduction pipe 70 is coupled to the tubular portion 20a and the discharge pipe 75 is coupled to the discharge pipe 60 has been illustrated here, but this embodiment is not limited to this. For example, it is also possible to couple the discharge pipe 75 to the tubular portion 20a and couple the discharge pipe 70 to the discharge pipe 60. Combinations of these couplings will be described later.

Here, a downstream end of the discharge pipe 55 and a downstream end of the discharge pipe 75 are coupled to compose a single discharge pipe 76 as illustrated in FIG. 1. A flow rate regulating valve 77 is provided in this discharge pipe 76. By making this composition, the pressure of the cooling medium to cool the outer casing 20 and the pressure of the cooling medium to cool the joint portion 61 can be made equal to each other.

The flow rate regulating valve 74 mainly regulates the flow rate of the cooling medium to cool the joint portion 61, and the flow rate regulating valve 77 is used for regulating the pressure mainly. The flow rate regulating valve 77 functions as a flow rate regulator.

One example where the downstream end of the discharge pipe 55 and the downstream end of the discharge pipe 75 are coupled has been illustrated here, but this embodiment is not limited to this formation. For example, it is also possible to maintain each of the discharge pipes 55 and 75 without coupling the downstream end of the discharge pipe 55 and the downstream end of the discharge pipe 75 to each other. In this case, a flow rate regulating valve is provided in each of the discharge pipe 55 and the discharge pipe 75.

As described above, providing the casing cooling system and the joint portion cooling system makes it possible to control the respective systems independently.

The above-described flow rate regulating valves 54, 74, and 77 are composed of a valve, and the like, for example. Further, in place of the flow rate regulating valves 54, 74, and 77, a throttle such as an orifice may be used.

Next, there will be explained a composition of the axial flow turbine 10 in the first embodiment including the above-described cooling medium systems.

Figure 3:
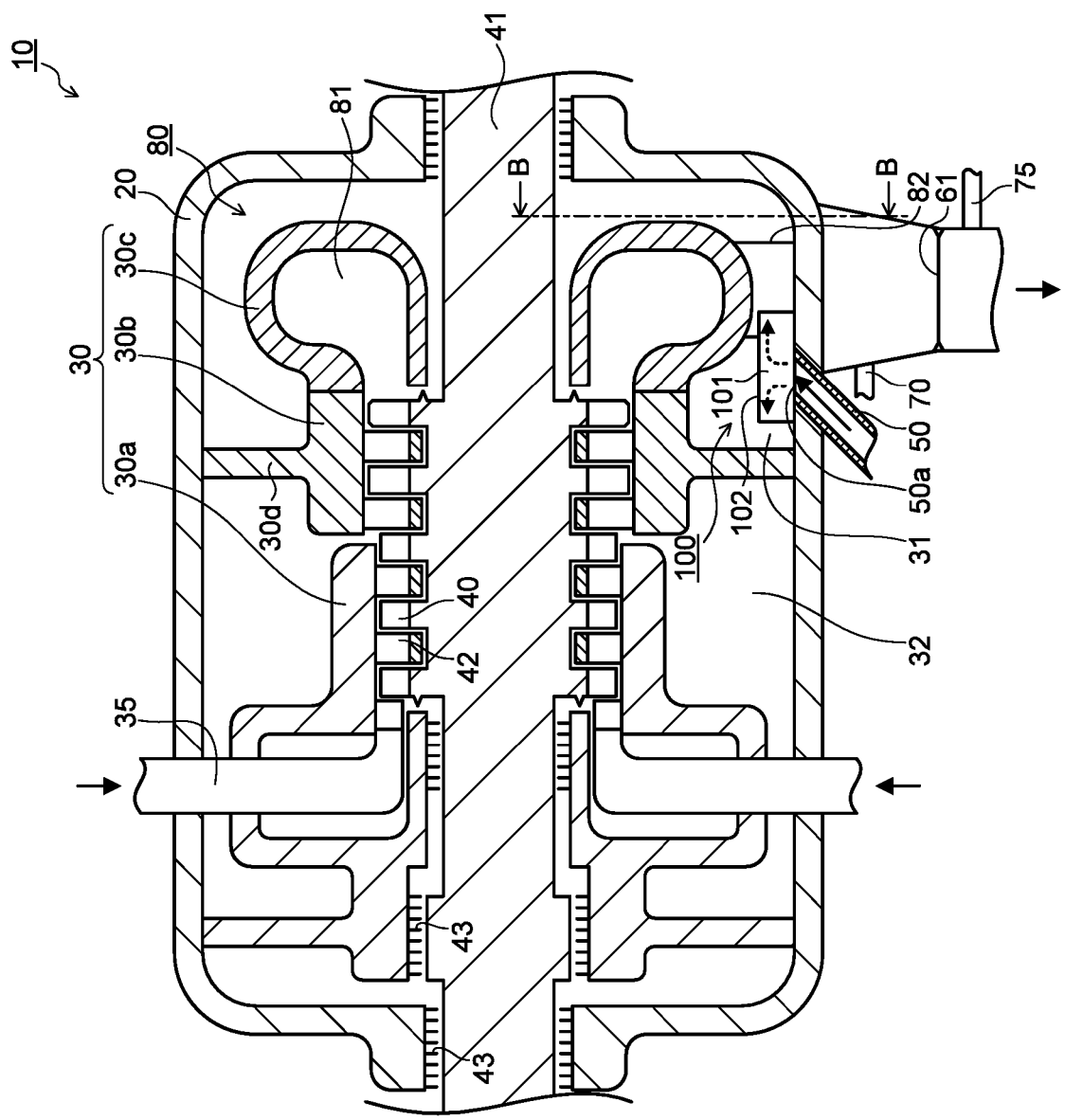
FIG. 3 is a view illustrating a meridian cross section of the axial flow turbine in the first embodiment.
Figure 4:
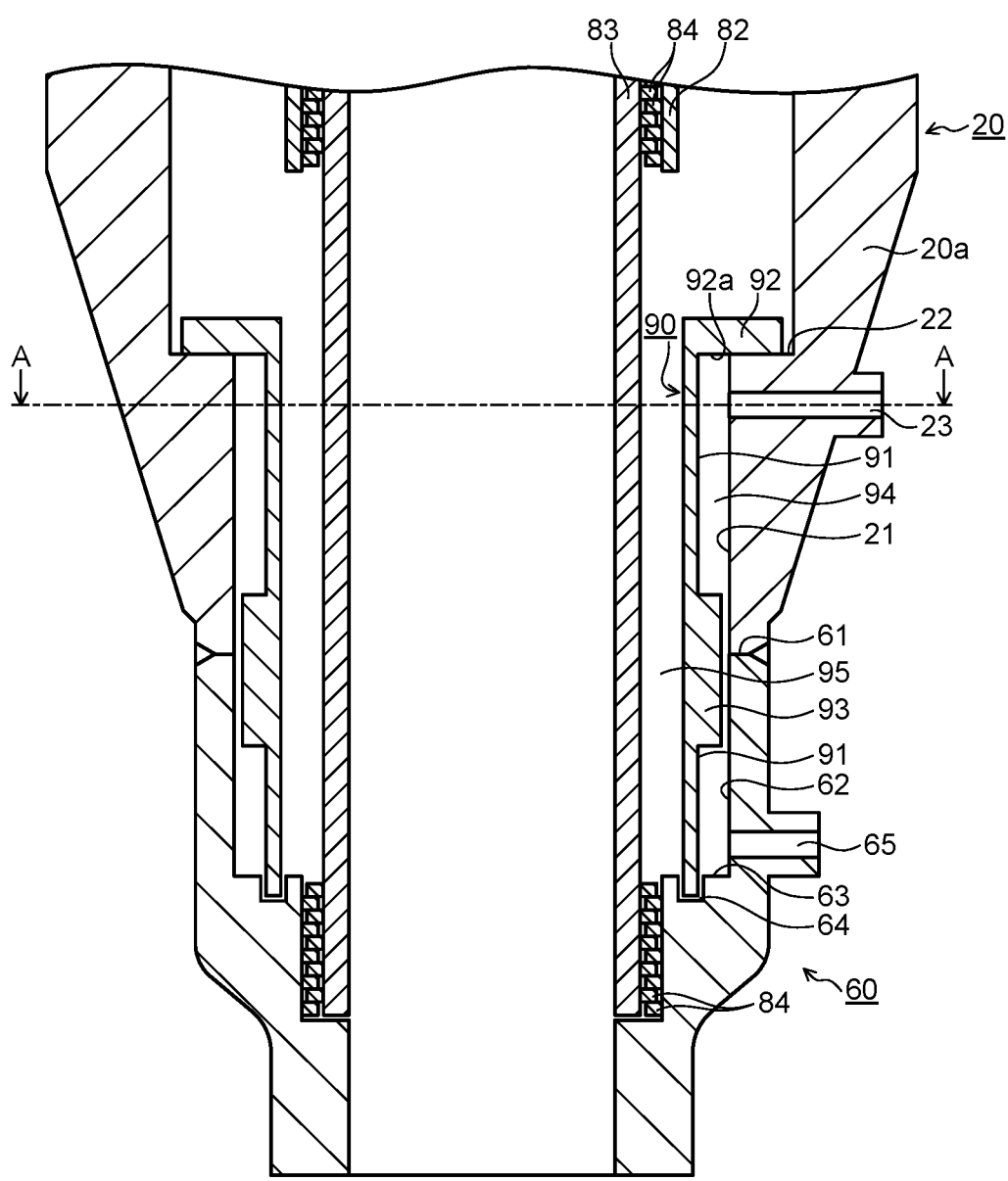
FIG. 4 is a view illustrating a longitudinal cross section of a tubular portion of an outer casing and a discharge pipe in the axial flow turbine in the first embodiment.

FIG. 3 is a view illustrating a meridian cross section of the axial flow turbine 10 in the first embodiment. FIG. 4 is a view illustrating a longitudinal cross section of the tubular portion 20a of the outer casing 20 and the discharge pipe 60 in the axial flow turbine 10 of the first embodiment.

As illustrated in FIG. 3, the axial flow turbine 10 includes a double-structure casing composed of the outer casing 20 and the inner casing 30 provided inside the outer casing 20.

As described previously, the inner casing 30 includes the inner casings 30a, 30b that surround the turbine stages including stationary blades 42 and rotor blades 40, for example, and the inner casing 30c that composes a part of an exhaust hood 80 into which the working fluid having passed through the final turbine stage flows.

Here, the outer casing 20 is formed of a conventional product such as high Cr steel or low Cr steel, for example. The inner casings 30a, 30b are formed of a conventional product such as high Cr steel or low Cr steel, for example, because the cooling medium intended for cooling the stationary blades flows through therein, for example. In the meantime, the inner casing 30c to increase in temperature is formed of a high-strength material, or the like, for example.

A turbine rotor 41 in which the rotor blades 40 are implanted is provided in the inner casing 30 so as to penetrate therethrough. This turbine rotor 41 is rotatably supported by a rotor bearing (not illustrated).

On inner surfaces of the inner casings 30a, 30b, the stationary blades 42 are provided alternately with the rotor blades 40 in a turbine rotor axial direction. The stationary blade 42 and the rotor blade 40 that is provided immediately downstream of this stationary blade 42 compose the turbine stage.

For example, an annular wall 30d projecting to a radial direction outer side is provided over a circumferential direction on an outer peripheral surface of the inner casing 30b adjacent to the inner casing 30c. An outer peripheral surface of this annular wall 30d is in contact with an inner periphery of the outer casing 20, for example. Then, the space formed between the inner casing 30 and the outer casing 20 is demarcated by this annular wall 30d. Therefore, a space 32 on an upstream side from the annular wall 30d and a space 31 on a downstream side from the annular wall 30d do not communicate.

The space 31 is a space surrounded by the outer casing 20, the inner casing 30c, the inner casing 30b, the annular wall 30d, and the turbine rotor 41. The space 32 is a space surrounded by the outer casing 20, the inner casing 30a, the inner casing 30b, and the annular wall 30d.

A sealing part 43 is provided between the turbine rotor 41 and the outer casing 20 and the inner casing 30a in order to prevent leakage of the working fluid into the outside.

At the downstream side of the final turbine stage, the exhaust hood 80 is provided. The exhaust hood 80 includes the annular inner casing 30c in which the working fluid that has passed through the final turbine stage flows and a tubular portion 82 provided on a lower half side of this inner casing 30c. An annular passage 81 is formed inside the annular inner casing 30c.

The annular passage 81 is formed around the periphery of the turbine rotor 41 as illustrated in FIG. 3. The annular passage 81 guides the working fluid that has passed through the final turbine stage to the tubular portion 82.

The tubular portion 82 is provided in a bifurcated shape so as to sandwich a lowermost portion of the annular passage 81, for example. Then, each of the tubular portions 82 is provided inside the tubular portion 20a of the outer casing 20 so as to extend downward along the tubular portion 20a. In this manner, the exhaust hood 80 is covered with the outer casing 20.

Here, as illustrated in FIG. 3, for example, the introduction pipe 50 that introduces the cooling medium between the outer casing 20 and the inner casing 30c is coupled to the lowermost portion of the outer casing 20. That is, the introduction pipe 50 is coupled to the lowermost portion of the outer casing 20, which is located between the tubular portions 20a.

The introduction pipe 50 is coupled to the outer casing 20 so as to incline toward the downstream side from the upstream side as illustrated in FIG. 3, for example. Then, the cooling medium is introduced into the space 31 from the introduction pipe 50. This space 31 is a space between the outer casing 20 and the inner casing 30c that compose the previously described outer casing cooling system.

The discharge pipe 55 that discharges the cooling medium introduced into the space 31, which is not illustrated in FIG.

3, is coupled to a predetermined place of the outer casing 20. The discharge pipe 55 may be coupled to the tubular portion 20a, for example.

One end of a tubular sleeve 83 is coupled to an end portion of the tubular portion 82 as illustrated in FIG. 4. The other end of the sleeve 83 extends to the inside of the discharge pipe 60. Then, the other end of the sleeve 83 is coupled to the discharge pipe 60.

A seal ring 84 is provided between the sleeve 83 and the tubular portion 82 and between the sleeve 83 and the discharge pipe 60. A plurality of the seal rings 84 are disposed in an axial direction of the sleeve 83. Providing the seal ring 84 prevents leakage of the working fluid from between the sleeve 83 and the tubular portion 82 and between the sleeve 83 and the discharge pipe 60.

A tubular member 90 is provided over an outer periphery of the sleeve 83 inside the tubular portion 20a and the discharge pipe 60 as illustrated in FIG. 4. This tubular member 90 is a tubular cylinder body extending in the axial direction of the sleeve 83. This tubular member 90 is provided so as to cover an inner periphery side of the joint portion 61. Further, a predetermined gap exists between an outer surface 91 of the tubular member 90 and inner surfaces 21, 61 of the tubular portion 20a and the discharge pipe 60.

The tubular member 90 includes, on one end thereof, a flange part 92 projecting to the radial direction outer side over the circumferential direction as illustrated in FIG. 4, for example. This flange part 92 is supported by a step portion 22 formed on the tubular portion 20a, for example. Then, the flange part 92 is fixed to the step portion 22 by a fixing member such as a bolt, for example. A method of fixing the flange part 92 is not limited to this. The flange part 92 may be welded and joined to the step portion 22, for example.

On the other hand, the other end of the tubular member 90 is an unfixed end that is not fixed. The other end of the tubular member 90 is fitted in an annular groove portion 64 formed in a step portion 63 of the discharge pipe 60 in the circumferential direction, for example. A slight gap is formed between the other end of the tubular member 90 and the groove portion 64.

Here, a material forming the tubular portion 20a and a material forming the discharge pipe 60 are different. Therefore, the above-described gap is formed by considering the difference in linear expansion coefficient between these materials. Then, this gap absorbs the difference in thermal expansion between the tubular portion 20a and the discharge pipe 60.

The formation of the unfixed end of the tubular member 90 is not limited to this. The unfixed end of the tubular member 90 only needs to have a structure that is not subjected to thermal stress by the difference in thermal expansion between the tubular portion 20a and the discharge pipe 60.

By the tubular member 90 being provided as above, the space formed by the sleeve 83, the tubular portion 20a, and the discharge pipe 60 is demarcated. Then, an annular space 94 surrounded by the outer surface 91 of the tubular member 90, the inner surfaces 21, 62 of the tubular portion 20a and the discharge pipe 60, one flat surface 92a of the flange part 92, and the step portion 63 is formed.

Further, the tubular member 90 may include a ridge part 93 projecting to the outer periphery side over the circumferential direction, for example, as illustrated in FIG. 4. This ridge part 93 is formed on the outer surface 91 of the tubular member 90 so as to have a predetermined length in the axial direction of the sleeve 83. An outer surface of the ridge part 93 is formed by a surface parallel to the inner surface 21 of the tubular portion 20a and the inner surface 62 of the discharge pipe 60, for example. The ridge part 93 is preferably formed at a position facing the joint portion 61, for example, as illustrated in FIG. 4.

A gap between the outer surface of the ridge part 93 and the inner surface 21 of the tubular portion 20a and the inner surface 62 of the discharge pipe 60 becomes narrower than the gap between the outer surface 91 of the tubular member 90 and the inner surface 21 of the tubular portion 20a and the inner surface 62 of the discharge pipe 60. The ridge part 93 may be formed on the tubular member 90 integrally, or formed separately from the tubular member 90.

The tubular portion 20a includes therein an introduction port 23 that introduces a cooling medium into the annular space 94 demarcated by the above-described tubular member 90. The introduction port 23 is formed on the flange part 92 side of the tubular member 90. Further, the introduction port 23 is formed on the flange part 92 side relative to the ridge part 93.

The introduction port 23 may be opened in a direction toward the center axis of the tubular member 90, for example, in an A-A cross section illustrated in FIG. 4. An opening direction of the introduction port 23 is not limited to this.

Figure 5:
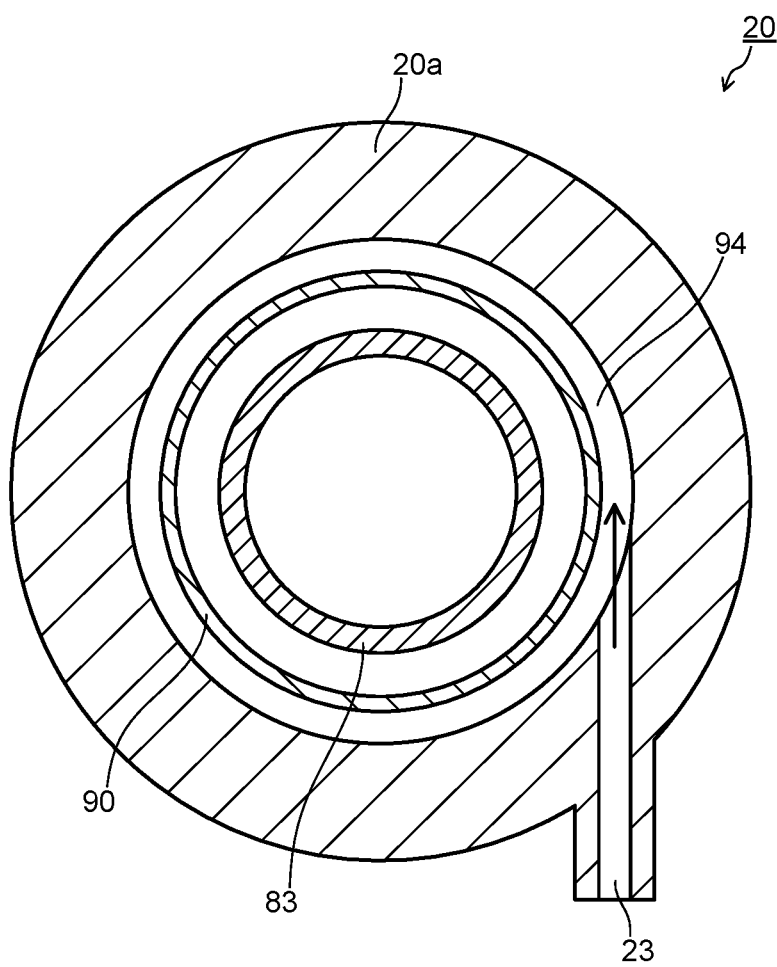
FIG. 5 is a view schematically illustrating one example of an A-A cross section in FIG. 4.

Here, FIG. 5 is a view schematically illustrating one example of the A-A cross section of FIG. 4. The introduction port 23 may be opened toward a direction different from the direction toward the center axis in a cross section vertical to the center axis of the tubular member 90 as illustrated in FIG. 5, for example. In this case, the cooling medium introduced into the space 94 from the introduction port 23 flows swirlingly. Creating the swirling flow as above enables the cooling medium to be introduced in the circumferential direction entirely. The single introduction port 23 or a plurality of the introduction ports 23 are provided.

On the other hand, the discharge pipe 60 includes a discharge port 65 that discharges the cooling medium introduced into the space 94 provided therein. The discharge port 65 is formed on the step portion 63 side of the discharge pipe 60. Further, the discharge port 65 is formed on the step portion 63 side relative to the ridge part 93.

The introduction port 23 is preferably provided on one end side to be a fixed end of the tubular member 90 (the flange part 92 side), and the discharge port 65 is preferably provided on the other end side to be an unfixed end. The introduction port 23 is coupled to the introduction pipe 70 explained with reference to FIG. 3. Further, the discharge port 65 is coupled to the discharge pipe 75 explained with reference to FIG. 3.

Here, in FIG. 4, the cooling medium introduced between the outer casing 20 and the inner casing 30 flows in a space 95 surrounded by the tubular portion 82 of the exhaust hood 80, the sleeve 83, the tubular portion 20a, and the tubular member 90.

The fixed end side of the tubular member 90 is sealed, and therefore the cooling medium in the space 95 does not flow into the space 94 from the fixed end side. On the other hand, the unfixed end side of the tubular member 90 is not sealed, and therefore the cooling medium in the space 95 flows into the space 94 from the unfixed end side depending on a pressure condition. The cooling medium in the space 95 is the resultant obtained after cooling the outer casing 20 and the like, and therefore its temperature becomes higher than that of the cooling medium flowing in the space 94.

Thus, introduction of the cooling medium from the fixed end side of the tubular member 90 makes it possible to cool the joint portion 61 without mixing with the high-temperature cooling medium. On the other hand, even if the cooling medium in the space 95 flows into the cooling medium obtained after cooling the joint portion 61 on the side where the cooling medium is discharged (unfixed end), no problem is caused. Introduction of the cooling medium from the fixed end side of the tubular member 90 as above enables secure cooling of the joint portion 61.

Here, the other end of the tubular member 90 may be set as the fixed end, and the one end thereof may be set as the unfixed end. In this case, the other end of the tubular member 90 is fixed to the step portion 63 of the discharge pipe 60, for example. Therefore, the cooling medium in the space 95 does not flow into the space 94 from the other end side of the tubular member 90. On the other hand, the cooling medium in the space 95 flows into the space 94 from the one end side of the tubular member 90. In the case of this formation, the discharge port 65 is provided in the one end side to be the unfixed end of the tubular member 90 (flange part 92 side), and the introduction port 23 is provided in the other end side to be the fixed end preferably.

As described above, providing the tubular member 90 and letting the cooling medium flow into the space 94 enable secure cooling of the joint portion 61. Further, providing the tubular member 90 enables prevention of thermal stress caused by contact of the cooling medium introduced from the introduction port 23 with the high-temperature sleeve 83. Furthermore, providing the tubular member 90 makes it possible to prevent the joint portion 61 from being heated by thermal radiation from the high-temperature sleeve 83.

Further, providing the ridge part 93 on the tubular member 90 narrows the flow of the cooling medium introduced from the introduction port 23 at the ridge part 93, and the cooling medium spreads out evenly in the circumferential direction. Further, when the cooling medium flows through the narrow gap between the ridge part 93 and the inner surfaces 21, 62 of the tubular portion 20a and the discharge pipe 60, its flow velocity increases to increase a heat transfer coefficient. Therefore, for example, providing the ridge part 93 in a manner to face the joint portion 61 enables more efficient cooling of the joint portion 61.

Further, as an effect of cooling the joint portion 61 improves, for example, the flow rate of the cooling medium to be introduced into the space 94 can be reduced. This makes it possible to reduce the flow rate of the extracted air when the extracted air of the axial flow turbine 10 is used as the cooling medium, resulting in that it is possible to improve turbine performance.

Next, there will be explained an operation of the axial flow turbine 10 and an action in the cooling medium system with reference to FIG. 1, FIG. 3, and FIG. 4.

Here, the axial flow turbine 10 includes a temperature sensor (not illustrated) that senses temperatures of the joint portion 61 and the outer casing 20 and a control unit (not illustrated), for example. Then, the control unit controls opening of each of the above-described flow rate regulating valves 54, 74, and 77 based on a sensed signal from the temperature sensor. The control unit is formed to be able to perform input/output of an electrical signal with the temperature sensor and each of the flow rate regulating valves 54, 74, and 77.

First, the operation of the axial flow turbine 10 will be explained.

The working fluid (combustion gas) from the combustor (not illustrated) passes through, for example, the transition piece 35 as illustrated in FIG. 3 to flow into the first turbine stage. The working fluid that has flowed into the turbine stage flows in the inner casings 30a, 30b while performing expansion work, and passes through the final turbine stage.

The working fluid that has passed through the final turbine stage passes through the annular passage 81, the tubular portion 82, and the sleeve 83 to be discharged from the discharge pipe 60. The working fluid discharged from the discharge pipe 60 is introduced into the main system in the axial flow turbine 10, for example.

Next, the action in the cooling medium system of the axial flow turbine 10 will be explained.

For example, the cooling medium supplied into the introduction pipe 50 from the main system in the axial flow turbine 10 is introduced between the outer casing 20 and the inner casing 30c as illustrated in FIG. 3. That is, the cooling medium is introduced into the space 31 from the introduction pipe 50.

Then, the introduced cooling medium spreads out into the space 31. The cooling medium introduced into the space 31 does not flow into the space 32 on the upstream side relative to the annular wall 30d. Further, the cooling medium introduced into the space 31 spreads out also into the space 95 illustrated in FIG. 4.

The cooling medium spreading out into the space 31 cools the outer casing 20 mainly. On this occasion, the cooling medium also cools the inner casing 30c. Further, the cooling medium spreading out into the space 95 cools the sleeve 83 and the tubular member 90.

Here, for example, the cooling medium that has cooled the outer casing 20, and the like flows into the space 95, and thus, the temperature of the cooling medium flowing in the space 95 is higher than that of the cooling medium immediately after being introduced into the axial flow turbine 10. Therefore, even when the high-temperature cooling medium comes into contact with the high-temperature sleeve 83, a large thermal stress is not caused.

Then, the cooling medium that has been introduced into the space 31 to then cool the outer casing 20 and the like is to be discharged into the discharge pipe 55 from the inside of the axial flow turbine 10 as illustrated in FIG. 1.

Here, the flow rate of the cooling medium to be introduced into the space 31 is regulated by the control unit setting the opening of the flow rate regulating valve 54 based on a sensed signal from the temperature sensor that senses the temperature of the outer casing 20.

When the temperature of the outer casing 20 exceeds the allowable temperature, for example, the flow rate of the cooling medium is increased. On the other hand, when the temperature of the outer casing 20 sufficiently falls below the allowable temperature, the flow rate of the cooling medium is reduced. The allowable temperature is set based on the material forming the outer casing 20, and the like, for example. Concretely, the allowable temperature is set based on the high-temperature strength of the material forming the outer casing 20, and the like, for example.

Here, the temperature of the cooling medium to be introduced into the space 31 is lower than the temperature of the outer casing 20, and is equal to or higher than the minimum temperature of the cooling medium at which a thermal stress caused in the inner casing 30c falls within an allowable range (to be referred to as a thermal stress allowable minimum temperature, hereinafter). The temperature of the cooling medium is made lower than the temperature of the outer casing 20, thereby making it possible to take heat away from the outer casing 20 to cool the outer casing 20. The temperature of the cooling medium is made equal to or higher than the thermal stress allowable minimum temperature, thereby enabling the thermal stress caused by contact of the cooling medium with the inner casing 30c to fall within the allowable range.

Further, the pressure of the cooling medium to be introduced into the space 31 is higher than the pressure of the working fluid flowing in the annular passage 81. In the axial flow turbine 10, for example, the inner casing 30b and the inner casing 30c adjacent thereto are formed of materials different from each other. In this case, a gap is provided between the inner casing 30b and the inner casing 30c by considering the difference in linear expansion coefficient between the respective materials, for example. This gap enables prevention of thermal stress caused by the difference in thermal expansion.

In the axial flow turbine 10 having such a structure, the pressure of the cooling medium to be introduced into the space 31 is set to the above-described pressure, thereby making it possible to prevent the working fluid from flowing into the space 31. This makes it possible to prevent the outer casing 20 from being heated by the inflow of the working fluid.

In the meantime, the cooling medium supplied into the introduction pipe 70 illustrated in FIG. 3 is introduced into the space 94 from the introduction port 23 in the tubular portion 20a illustrated in FIG. 4. The flow of the cooling medium introduced into the space 94 is narrowed at the ridge part 93, for example, and thereby the cooling medium spreads out evenly in the circumferential direction. Then, the cooling medium flows through the narrow gap between the ridge part 93 and the inner surfaces 21, 62 of the tubular portion 20a and the discharge pipe 60 to cool the joint portion 61. On this occasion, the flow velocity of the cooling medium increases to increase the heat transfer coefficient, and thereby the cooling of the joint portion 61 is promoted.

The flow rate of the cooling medium to be introduced into the space 94 is regulated by the control unit setting the opening of the flow rate regulating valve 74 based on a sensed signal from the temperature sensor that senses the temperature of the joint portion 61.

For example, when the temperature of the joint portion 61 exceeds the allowable temperature, the flow rate of the cooling medium is increased. On the other hand, when the temperature of the joint portion 61 sufficiently falls below the allowable temperature, the flow rate of the cooling medium is reduced. The allowable temperature is set based on the material forming the joint portion 61, and the like, for example. Concretely, the allowable temperature is set based on the high-temperature strength of the joint portion 61, and the like, for example.

The cooling medium that has passed through the ridge part 93 is discharged into the discharge pipe 75 illustrated in FIG. 3 from the discharge port 65. Since the tubular member 90 on the discharge port 65 side has the unfixed end, in the case when the pressure of the cooling medium in the space 95 is higher than the pressure of the cooling medium in the space 94, the cooling medium in the space 95 passes through the gap between the other end of the tubular member 90 and the groove portion 64 to flow into the space 94. Also in this case, the high-temperature cooling medium in the space 95 is discharged from the discharge port 65 together with the cooling medium in the space 94. Therefore, the cooling medium in the space 95 that has flowed into the space 94 never prevents cooling of the joint portion 61, and the like.

Here, as illustrated in FIG. 1, the discharge pipe 55 and the discharge pipe 75 are coupled to compose the discharge pipe 76. Then, the flow rate regulating valve 77 is provided in this discharge pipe 76. That is, it is possible to make the pressure of the cooling medium between the outer casing 20 and the inner casing 30 and the pressure of the cooling medium in the space 94 equal. In other words, it is possible to make the pressure of the cooling medium in the space 95 and the pressure of the cooling medium in the space 94 equal. This makes it possible to prevent leakage of the cooling medium in the space 95 into the space 94. Further, it is possible to prevent leakage of the cooling medium in the space 94 into the space 95.

Here, a downstream end of the discharge pipe 76 is coupled to, for example, a pipe through which the working fluid having a temperature that does not cause cracking or the like due to a thermal stress caused by the cooling medium introduced from the discharge pipe 76 flows. The downstream end of the discharge pipe 76 is coupled to, for example, a portion through which the working fluid having a temperature almost the same as the temperature of the cooling medium flowing through the discharge pipe 76 or a temperature lower than the temperature of the cooling medium flowing through the discharge pipe 76 flows. The pressure of the cooling medium flowing through the discharge pipe 76 is higher than the pressure of the working fluid flowing through the portion into which the cooling medium is introduced. This makes it possible to prevent the working fluid from flowing into the discharge pipe 76.

Even in a formation in which the downstream end of the discharge pipe 55 and the downstream end of the discharge pipe 75 are not coupled, the downstream ends are coupled to the pipe through which the working fluid having a temperature that does not cause cracking or the like due to a thermal stress caused by the cooling medium introduced from the discharge pipe 55 flows and to the pipe through which the working fluid having a temperature that does not cause cracking or the like due to a thermal stress caused by the cooling medium introduced from the discharge pipe 75 flows respectively.

According to the axial flow turbine 10 in the above-described first embodiment, providing the tubular member 90 and letting the cooling medium flow into the space 94 enable secure cooling of the joint portion 61. Further, providing the tubular member 90 enables prevention of thermal stress caused by contact of the cooling medium introduced from the introduction port 23 with the high-temperature sleeve 83. Furthermore, providing the tubular member 90 makes it possible to prevent the joint portion 61 from being heated by thermal radiation from the high-temperature sleeve 83.

As above, according to the axial flow turbine 10, it is possible to maintain the temperature of the joint portion 61 to the allowable temperature or lower while suppressing a thermal stress due to the sleeve 83 and the like.

Providing the ridge part 93 on the tubular member 90 enables the cooling medium introduced from the introduction port 23 to spread over evenly in the circumferential direction at the ridge part 93. This makes it possible to cool the joint portion 61 uniformly over the circumferential direction.

Further, providing the ridge part 93 makes it possible to increase the velocity of the cooling medium flowing through the narrow gap between the ridge part 93 and the inner surfaces 21, 62 of the tubular portion 20a and the discharge pipe 60 and promote cooling of the joint portion 61. As the effect of cooling the joint portion 61 is promoted, the flow rate of the cooling medium to be introduced into the space 94 can be reduced, for example. This makes it possible to reduce the flow rate of the air extracted from the axial flow turbine 10 and improve the turbine performance, for example.

Further, according to the axial flow turbine 10, providing the casing cooling system and the joint portion cooling system makes it possible to control the respective systems independently. As above, it is possible to cool the outer casing 20 other than the joint portion 61 in the axial flow turbine 10.

Here, the composition of the axial flow turbine 10 according to the first embodiment is not limited to the above-described composition. One example where the outer casing 20 includes the two tubular portions 20a in the above-described axial flow turbine 10 has been explained. In this composition, the tubular portions 20a are coupled to the two introduction pipes 70 resulting from branching on the downstream side of the flow rate regulating valve 74 respectively.

Here, the flow rate regulating valve 74 is not limited to being provided on the upstream side of the introduction pipe 70 to branch. For example, the flow rate regulating valve 74 may be provided in each of the introduction pipes 70 on the downstream side relative to branch points to be coupled to the tubular portions 20a.

Figure 6:
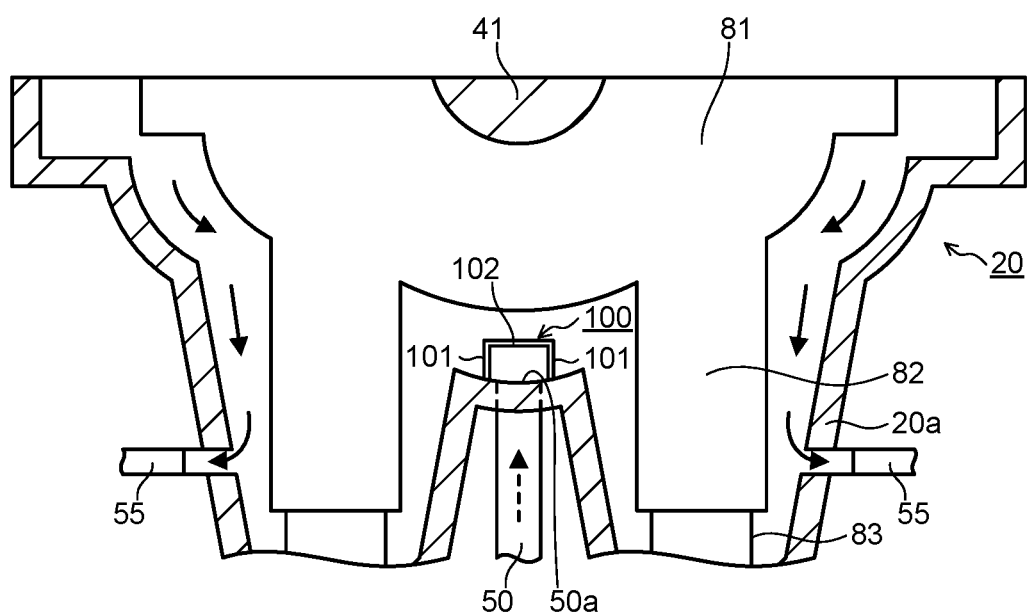
FIG. 6 is a view schematically illustrating a B-B cross section in FIG. 3.

FIG. 6 is a view schematically illustrating a B-B cross section in FIG. 3. In FIG. 6, the flow of the cooling medium introduced from the introduction pipe 50 is indicated by arrows.

As illustrated in FIG. 3 and FIG. 6, a guidance member 100 that guides the flow of the cooling medium is disposed at a position facing an exit 50a of the introduction pipe 50 inside the outer casing 20. This guidance member 100 includes two sidewalls 101 and a top plate 102 connected to these sidewalls 101. The sidewalls 101 and the top plate 102 are each formed of a rectangular flat plate, for example. That is, the guidance member 100 has a channel shape (a U shape) in cross section as illustrated in FIG. 6.

The top plate 102 faces the exit 50a of the introduction pipe 50 with a predetermined gap provided therebetween. The two sidewalls 101 are disposed to face each other along the turbine rotor axial direction with a predetermined gap provided therebetween in the circumferential direction as illustrated in FIG. 3. That is, the guidance member 100 has an opening on the side facing the top plate 102 and openings at the upstream end and the downstream end in the turbine rotor axial direction.

The cooling medium that has flowed out through the exit 50a of the introduction pipe 50 collides with the top plate 102 to be guided in the turbine rotor axial direction (the arrow directions illustrated in FIG. 3) along the top plate 102 and the sidewalls 101. Therefore, the cooling medium that has flowed out through the exit 50a is not blown onto the inner casing 30c directly. In FIG. 6, the cooling medium resulting from the collision with the top plate 102 flows in directions vertical to the paper.

The cooling medium guided in the turbine rotor axial direction flows along the inner surface of the outer casing 20. On this occasion, a part of the cooling medium flows into the upper half side. Then, for example, the cooling medium that has flowed to the upper half side flows to the lower half side along the inner surface of the outer casing 20 as indicated by the arrows in FIG. 6.

Then, the cooling medium that has cooled the outer casing 20 is discharged into the discharge pipes 55 through discharge ports provided in the tubular portions 20a of the outer casing 20, for example.

Providing the guidance member 100 as above makes it possible to prevent the cooling medium that has flowed out through the exit 50a of the introduction pipe 50 from being blown onto the inner casing 30c directly. This makes it possible to prevent a large thermal stress from being caused in the inner casing 30c.

Further, providing the guidance member 100 enables the cooling medium to spread over the space 31 entirely. This makes it possible to cool the outer casing 20 evenly.

Here, the shape of the guidance 100 is not limited to the above-described shape. For example, the top plate 102 may be curved so as to have a center portion thereof in the circumferential direction projecting outward. In other words, the top plate 102 may be formed to have a semicylinder shape.

Further, the guidance member 100 may be formed in a cylinder that covers the periphery of the inner casing 30c with a predetermined gap provided between the guidance member 100 and the outer peripheral surface of the inner casing 30c. This cylinder is supported by a bar-shaped support projecting to the radial direction outer side from the outer peripheral surface of the inner casing 30c, for example. This support is provided plurally in the circumferential direction, for example.

That is, as for the shape of the guidance member 100, it only needs to have a structure capable of preventing the cooling medium that has flowed out through the exit 50a of the introduction pipe 50 from being blown onto the inner casing 30c directly.

Further, in this embodiment, one example where the tubular portions 20a are provided on the lower half side of the outer casing 20 has been described, but they may be provided on the upper half side of the outer casing 20.

Further, an introduction pipe that introduces a cooling medium from a supply source different from the supply source that supplies the cooling medium into the introduction pipe 50 may be coupled to the introduction pipe 50 on the upstream side relative to the flow rate regulating valve 54. Furthermore, an introduction pipe that introduces a cooling medium from a supply source different from the supply source that supplies the cooling medium into the introduction pipe 70 may be coupled to the introduction pipe 70 on the upstream side relative to the flow rate regulating valve 74.

Here, the above-described different supply sources are supply sources in systems different from the systems that supply the cooling medium into the introduction pipe 50 and the introduction pipe 70, for example. Therefore, the different supply sources can supply the cooling medium into the introduction pipe 50 and the introduction pipe 70 even when the operation of the main system in the axial flow turbine 10 stops, for example. That is, the different supply sources have a function as an auxiliary supply source.

Here, as an example where the axial flow turbine 10 stops, for example, a state immediately after normal stop of the operation of the axial flow turbine 10, a turbine trip state where the operation of the axial flow turbine 10 stops suddenly, and so on can be cited.

The cooling mediums to be supplied from the different supply sources are also a medium having suitable temperature and pressure as the cooling medium, similarly to the cooling mediums to be introduced into the introduction pipe 50 and the introduction pipe 70. As the cooling mediums to be supplied from the different supply sources, in the case of the gas turbine, air, and so on can be cited, and in the case of the $CO_2$ turbine, carbon dioxide, and so on can be cited.

The cooling mediums supplied from these different supply sources flow into the introduction pipe 50 and the introduction pipe 70 respectively to act similarly to the previously described cooling mediums.

Second Embodiment

Figure 7:
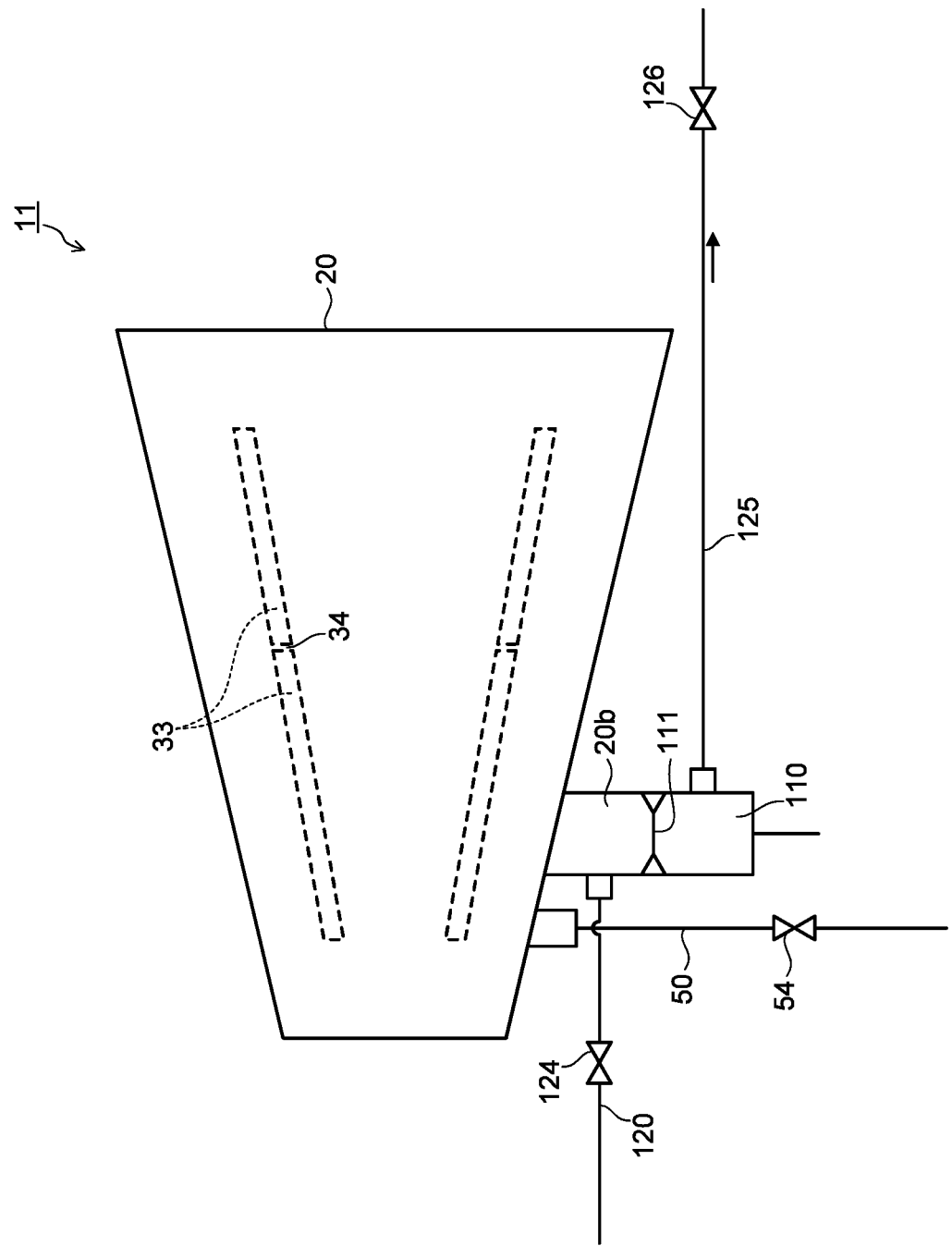
FIG. 7 is a view schematically illustrating cooling medium systems in an axial flow turbine in a second embodiment.

FIG. 7 is a view schematically illustrating cooling medium systems in an axial flow turbine 11 in a second embodiment. In the second embodiment, the same reference numerals and symbols are added to the same components as those in the composition in the first embodiment, and their overlapping explanations are omitted or simplified.

Here, as the axial flow turbine 11 illustrated in FIG. 7, for example, a steam turbine, and so on can be cited. An outer casing cooling system in the axial flow turbine 11 is the same as the outer casing cooling system in the first embodiment except that the discharge pipe 55 is not included. Further, the temperature of a working fluid at the entrance of the steam turbine is greater than 630° C., for example.

As a cooling medium to be introduced into an introduction pipe 50, steam extracted from a system, and so on can be cited. The extracting is performed at a place where a medium having suitable temperature and pressure as the cooling medium can be obtained. In this manner, for example, the medium extracted from the main system in the axial flow turbine 11 is supplied into the introduction pipe 50 as the cooling medium.

A part of the cooling medium introduced between an outer casing 20 and an inner casing 33 from the introduction pipe 50 flows out to a passage in the inner casing 33, in which a working fluid flows, through a gap 34 between the inner casings 33, which will be explained in detail later. Then, the cooling medium that has flowed out to the passage in which the working fluid flows is discharged from the axial flow turbine 11 together with the working fluid. The remaining part of the cooling medium is exhausted from a sealing part between the outer casing 20 and a turbine rotor 41, for example. The working fluid is steam.

As above, the outer casing cooling system that cools the outer casing 20 mainly is composed by the introduction pipe 50, the space between the outer casing 20 and the inner casing 33 and the like.

As illustrated in FIG. 7, for example, a tubular portion 20b extending downward is provided on a lower half side of the outer casing 20 on the upstream side in order to introduce the working fluid. One tubular portion 20b or a plurality of tubular portions 20b are provided. Then, an introduction pipe 110 through which the working fluid to be introduced into the axial flow turbine 11 flows is welded and joined to the tubular portion 20b of the outer casing 20.

In this embodiment, a composition including the two tubular portions 20b is described as an example. When the axial flow turbine 11 is seen from the upstream side, the two tubular portions 20b, similarly to the tubular portions 20a illustrated in FIG. 2, are formed in a bifurcated shape so as to sandwich a lowermost portion of the outer casing 20. Then, the tubular portions 20b are each provided to extend downward. Then, the discharge pipes 110 are welded and joined to these tubular portions 20b respectively.

FIG. 7 illustrates a state where the tubular portion 20b on one side is seen and the tubular portion 20b on the other side is not seen. The introduction pipe 110 functions as a working fluid introduction pipe.

For example, an introduction pipe 120 that introduces a cooling medium to cool a joint portion 111 between the tubular portion 20b and the introduction pipe 110 from the inner side is coupled to the tubular portion 20b of the outer casing 20. Though not illustrated in FIG. 7, an introduction pipe 120 resulting from branching on a downstream side of a later-described flow rate regulating valve 124 is coupled to the tubular portion 20b on the other side as well.

For example, the medium extracted from the main system in the axial flow turbine 11 is supplied into this introduction pipe 120 as the cooling medium. The cooling medium to be supplied into the introduction pipe 120 only needs to be a medium having suitable temperature and pressure as the cooling medium.

Further, as illustrated in FIG. 7, the flow rate regulating valve 124 is provided in the introduction pipe 120. The flow rate regulating valve 124 regulates the flow rate of the cooling medium to be introduced into the inner side of the joint portion 111 through the introduction pipe 120. In other words, the flow rate regulating valve 124 regulates the pressure of the cooling medium to be introduced into the inside of the tubular portion 20b and the introduction pipe 110.

For example, the flow rate regulating valve 124 regulates the flow rate of the cooling medium to the most suitable flow rate based on the temperature of the joint portion 111 at startup, during operation, after a stop, and the like of the axial flow turbine 11. The flow rate regulating valve 124 functions as a flow rate regulator.

The cooling medium introduced into the inside of the tubular portion 20b and the introduction pipe 110 from the introduction pipe 120 is discharged through a discharge pipe 125 as illustrated in FIG. 7. The discharge pipe 125 is coupled to the introduction pipe 110, for example. A flow rate regulating valve 126 is provided in the discharge pipe 125, for example.

The flow rate regulating valve 124 mainly regulates the flow rate of the cooling medium to cool the joint portion 111, and the flow rate regulating valve 126 is used for regulating the pressure mainly. The flow rate regulating valve 126 functions as a flow rate regulator.

As above, a joint portion cooling system that cools the joint portion 111 is composed by the introduction pipe 120, the internal space of the tubular portion 20b and the introduction pipe 110, the discharge pipe 125, and the like.

As described above, providing the casing cooling system and the joint portion cooling system makes it possible to control the respective systems independently.

The above-described flow rate regulating valves 54, 124, and 126 are composed of a valve, and the like, for example. Further, a throttle such as an orifice may be used in place of the flow rate regulating valves 54, 124, and 126.

Next, there will be explained a composition of the axial flow turbine 11 in the second embodiment including the above-described cooling medium systems.

Figure 8:
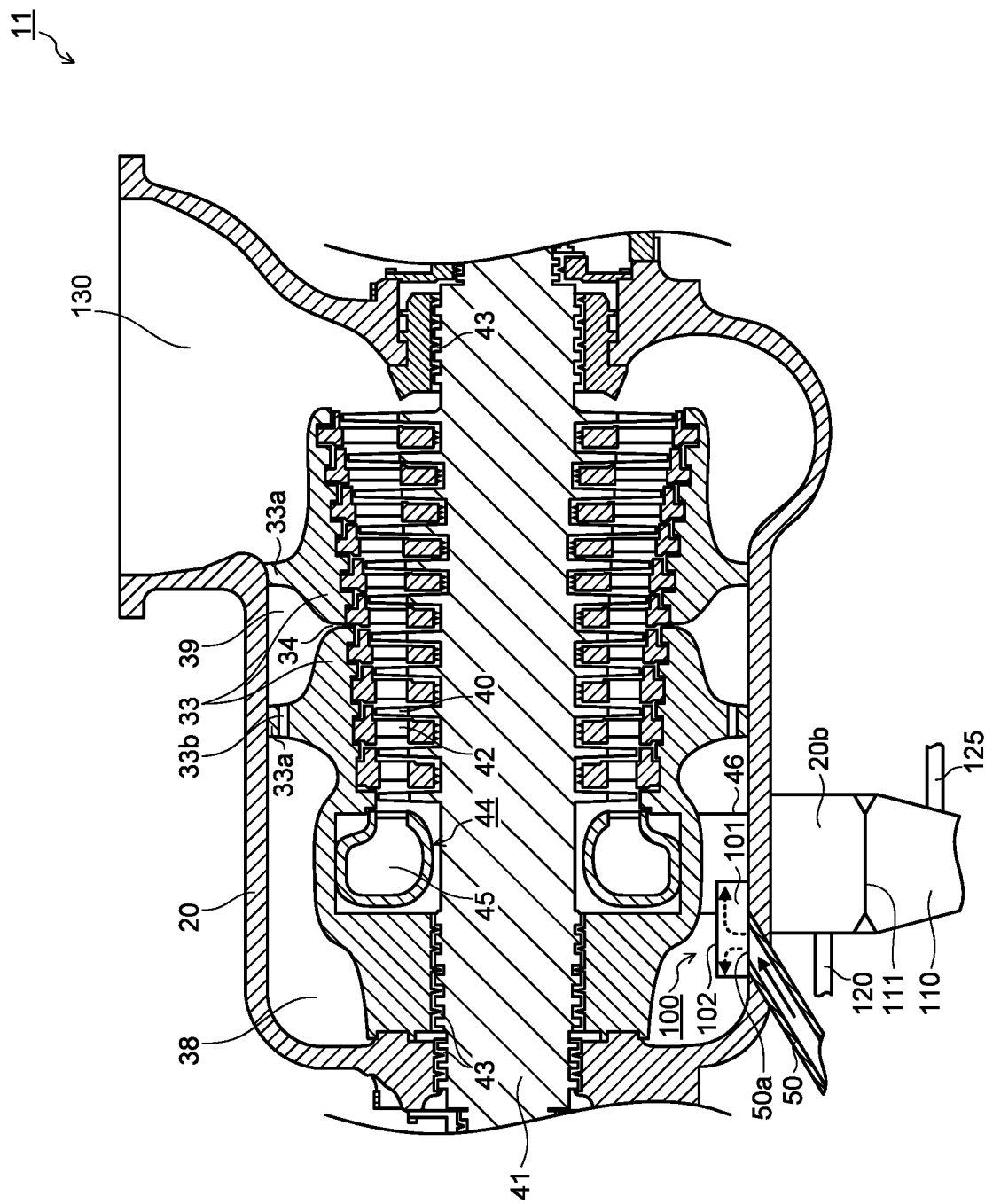
FIG. 8 is a view illustrating a meridian cross section of the axial flow turbine in the second embodiment.

FIG. 8 is a view illustrating a meridian cross section of the axial flow turbine 11 in the second embodiment. As illustrated in FIG. 8, the axial flow turbine 11 includes a double-structure casing composed of the outer casing 20 and the inner casing 33 provided inside the outer casing 20. Further, the turbine rotor 41 in which rotor blades 40 are implanted is provided in the inner casing 33 so as to penetrate therethrough. The turbine rotor 41 is rotatably supported by a rotor bearing (not illustrated).

Here, the inner casing 33 is divided in the turbine rotor axial direction, for example. Then, the gap 34 is formed between the upstream-side inner casing 33 and the downstream-side inner casing 33.

Stationary blades 42 are provided alternately with the rotor blades 40 in the turbine rotor axial direction on an inner surface of the inner casing 33. Then, the inner casing 33 surrounds turbine stages including the stationary blades 42 and the rotor blades 40. This inner casing 33 is formed of a high-strength material, and the like, for example.

For example, an annular wall 33a projecting to the radial direction outer side is provided over the circumferential direction on an outer peripheral surface of the inner casing 33. An outer peripheral surface of the annular wall 33a is in contact with an inner periphery of the outer casing 20, for example. Then, the annular wall 33a demarcates the space formed between the inner casing 33 and the outer casing 20 into a space 38 and a space 39.

Further, as illustrated in FIG. 8, a communication hole 33b is formed in the annular wall 33a on the upstream side. This communication hole 33b is formed plurally in the circumferential direction, for example. In the space between the outer casing 20 and the inner casing 33, the cooling steam flows through the communication holes 33b.

A sealing part 43 is provided between the turbine rotor 41 and the outer casing 20 and the inner casing 33 in order to prevent leakage of the working fluid into the outside.

A nozzle box 44 including the stationary blade 42 at the first turbine stage is provided in the inner casing 33. The nozzle box 44 includes an annular passage 45 forming an annular passage between the inner casing 33 and the turbine rotor 41, and a tubular portion 46 provided on the lower half side of this annular passage 45.

The tubular portion 46 is provided in a bifurcated shape so as to sandwich a lowermost portion of the annular passage 45, for example. Then, the tubular portions 46 are each provided in the tubular portion 20b of the outer casing 20 so as to extend downward along the tubular portion 20b. These tubular portions 46 guide the high-temperature working fluid introduced into the axial flow turbine 11 to the annular passage 45.

For example, the introduction pipe 50 that introduces the cooling medium between the outer casing 20 and the inner casing 33 is coupled to a lowermost portion of the outer casing 20 as illustrated in FIG. 8. That is, the introduction pipe 50 is coupled to the lowermost portion of the outer casing 20 between the tubular portions 20b.

The introduction pipe 50 is coupled to the outer casing 20 so as to incline toward the downstream side from the upstream side as illustrated in FIG. 8, for example. Then, the cooling medium is introduced into the space 38 surrounded by the outer casing 20 and the upstream-side inner casing 33 from the introduction pipe 50, for example.

An exhaust hood 130 is provided on the downstream side of the final turbine stage.

Here, internal constitutions of the tubular portion 20b of the outer casing 20 and the introduction pipe 110 are the same as those of the tubular portion 20a of the outer casing 20 and the discharge pipe 60 in the first embodiment.

The explanation with reference to FIG. 4 reveals that the tubular portion 20b corresponds to the tubular portion 20a and the introduction pipe 110 corresponds to the discharge pipe 60. The tubular portion 46 corresponds to the tubular portion 82. One end of a tubular sleeve 83 is coupled to an end portion of the tubular portion 46. The other end of the sleeve 83 is extended to the inside of the introduction pipe 110. Then, the other end of the sleeve 83 is coupled to the introduction pipe 110.

A seal ring 84 is provided between the sleeve 83 and the tubular portion 46 and between the sleeve 83 and the introduction pipe 110. A tubular member 90 is provided over an outer periphery of the sleeve 83 inside the tubular portion 20b and the introduction pipe 110.

In the tubular portion 20b, an introduction port 23 that introduces a cooling medium into an annular space 94 demarcated by the tubular member 90 is provided. This introduction port 23 is coupled to the introduction pipe 120.

On the other hand, a discharge port 65 that discharges the cooling medium introduced into the space 94 is provided in the introduction pipe 110. This discharge port 65 is coupled to the discharge pipe 125.

The portion in which the introduction port 23 is formed and the portion in which the discharge port 65 is formed are set appropriately by the positions of a fixed end and an unfixed end of the tubular member 90, as has been explained in the first embodiment. An opening direction of the introduction port 23 is also as explained in the first embodiment. Further, similarly to the first embodiment, a guidance member 100 may be provided.

As described above, providing the tubular member 90 and letting the cooling medium into the space 94 enable secure cooling of the joint portion 111. Further, providing the tubular member 90 enables prevention of thermal stress caused by contact of the cooling medium introduced from the introduction port 23 with the high-temperature sleeve 83. Furthermore, providing the tubular member 90 makes it possible to prevent the joint portion 111 from being heated by thermal radiation from the high-temperature sleeve 83.

Further, as an effect of cooling the joint portion 111 improves, for example, the flow rate of the cooling medium to be introduced into the space 94 can be reduced.

Next, there will be explained an operation of the axial flow turbine 11 and an action in the cooling medium system with reference to FIG. 7 and FIG. 8.

Here, the axial flow turbine 11 includes a temperature sensor (not illustrated) that senses temperatures of the joint portion 111 and the outer casing 20 and a control unit (not illustrated), for example. Then, the control unit controls opening of each of the above-described flow rate regulating valves 54, 124, and 126 based on a sensed signal from the temperature sensor. The control unit is formed to be able to perform input/output of an electrical signal with the temperature sensor and each of the flow rate regulating valves 54, 124, and 126.

First, the operation of the axial flow turbine 11 will be explained.

The high-temperature and high-pressure working fluid (steam) that operates the axial flow turbine 11 flows into the annular passage 45 through the introduction pipe 110, the sleeve 83, and the tubular portion 46 as illustrated in FIG. 8. The working fluid that has flowed into the annular passage 45 spreads out in the circumferential direction and is blown out onto the first-stage rotor blade 40 from the first-stage stationary blade 42.

The working fluid that has flowed into the turbine stage flows in the inner casing 33 while performing expansion work, and passes through the final turbine stage. Then, the working fluid that has passed through the final turbine stage passes through the exhaust hood 130 to be discharged. The working fluid discharged from the exhaust hood 130 is introduced into another steam turbine, for example.

Next, the action of the cooling medium system in the axial flow turbine 11 will be explained.

Here, the action different from that of the cooling medium system in the first embodiment will be explained mainly.

For example, at the time of operation of the axial flow turbine 11, the cooling medium supplied into the introduction pipe 50 from the main system in the axial flow turbine 11 is introduced into the space 38 as illustrated in FIG. 8. The cooling medium spreading out in the space 38 cools the outer casing 20 mainly. Further, the cooling medium spreading out in the space 38 passes through the communication hole 33b in the annular wall 33a to be introduced into the space 39. The cooling medium spreading out in the space 39 cools the outer casing 20 mainly. The inner casing 33 is also cooled by the cooling medium spreading out in the spaces 38, 39.

Here, the pressure of the cooling medium introduced into the space 39 is higher than that of the working fluid flowing in the inner casing 33 with the gap 34 formed therein at the turbine rotor axial direction position. Therefore, a part of the cooling medium introduced into the space 39 flows out into a passage where the working fluid flows in the inner casing 33 through the gap 34 between the inner casings 33 illustrated in FIG. 8. Then, the cooling medium is discharged from the exhaust hood 130 together with the working fluid.

On the other hand, the remaining part of the cooling medium is exhausted from the sealing part 43 between the outer casing 20 and the turbine rotor 41, for example.

The cooling medium supplied into the introduction pipe 120 acts similarly to the cooling medium supplied into the space 94 from the introduction pipe 70 in the first embodiment (see FIG. 4). The flow rate of the cooling medium introduced into the space 94 from the introduction pipe 120 is regulated by the control unit setting the opening of the flow rate regulating valve 124 based on a sensed signal from the temperature sensor that senses the temperature of the joint portion 111. Then, the cooling medium introduced into the space 94 is discharged into the discharge pipe 125 as illustrated in FIG. 7 and FIG. 8.

Here, a downstream end of the discharge pipe 125 is coupled to, for example, a pipe through which the working fluid having a temperature that does not cause cracking or the like due to a thermal stress caused by the cooling medium introduced from the discharge pipe 125 flows. The downstream end of the discharge pipe 125 is coupled to, for example, a portion through which the working fluid having a temperature almost the same as the temperature of the cooling medium flowing through the discharge pipe 125 or a temperature lower than the temperature of the cooling medium flowing through the discharge pipe 125 flows. The pressure of the cooling medium flowing through the discharge pipe 125 is higher than the pressure of the working fluid flowing through the portion into which the cooling medium is introduced. This makes it possible to prevent the working fluid from flowing into the discharge pipe 125.

According to the axial flow turbine 11 in the above-described second embodiment, providing the tubular member 90 and letting the cooling medium flow into the space 94 enable secure cooling of the joint portion 111. Further, providing the tubular member 90 enables prevention of thermal stress caused by contact of the cooling medium introduced from the introduction port 23 with the high-temperature sleeve 83. Furthermore, providing the tubular member 90 makes it possible to prevent the joint portion 111 from being heated by thermal radiation from the high-temperature sleeve 83.

As above, according to the axial flow turbine 11, it is possible to maintain the temperature of the joint portion 111 to the allowable temperature or lower while suppressing a thermal stress due to the sleeve 83 and the like.

Further, according to the axial flow turbine 11, providing the casing cooling system and the joint portion cooling system makes it possible to control the respective systems independently. As above, it is possible to cool the outer casing 20 other than the joint portion 111 in the axial flow turbine 11.

Further, an introduction pipe that introduces a cooling medium from a supply source different from the supply source that supplies the cooling medium into the introduction pipe 50 may be coupled to the introduction pipe 50 on the upstream side relative to the flow rate regulating valve 54. Furthermore, an introduction pipe that introduces a cooling medium from a supply source different from the supply source that supplies the cooling medium into the introduction pipe 120 may be coupled to the introduction pipe 120 on the upstream side relative to the flow rate regulating valve 124.

Here, the above-described different supply sources are supply sources in systems different from the systems that supply the cooling medium into the introduction pipe 50 and the introduction pipe 120, for example. Therefore, the different supply sources can supply the cooling medium into the introduction pipe 50 and the introduction pipe 120 even when the operation of the main system in the axial flow turbine 11 stops, for example. That is, the different supply sources have a function as an auxiliary supply source.

The cooling mediums to be supplied from the different supply sources are also a medium having suitable temperature and pressure as the cooling medium, similarly to the cooling mediums to be introduced into the introduction pipe 50 and the introduction pipe 120. The cooling mediums to be supplied from the different supply sources are steam.

The cooling mediums supplied from these different supply sources flow into the introduction pipe 50 and the introduction pipe 120 respectively to act similarly to the previously described cooling mediums.

According to the above-explained embodiments, it becomes possible to securely cool a welded joint portion while suppressing a thermal stress caused in a composing member.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An axial flow turbine, comprising:
    an outer casing;
    an inner casing provided inside the outer casing;
    a turbine rotor provided in the inner casing so as to penetrate therethrough;
    rotor blades implanted in the turbine rotor;
    stationary blades supported by a support member provided on an inner side of the inner casing, the stationary blades being disposed alternately with the rotor blades in a turbine rotor axial direction;
    a working fluid discharge pipe that is welded and joined to the outer casing and through which a working fluid discharged from the axial flow turbine flows;
    a tubular sleeve that is provided inside the outer casing and the working fluid discharge pipe and guides the working fluid discharged from the axial flow turbine to the working fluid discharge pipe;
    a tubular member provided over an outer periphery of the sleeve inside the outer casing and the working fluid discharge pipe, the tubular member covering an inner periphery side of a welded joint portion between the outer casing and the working fluid discharge pipe;

an introduction port that introduces a cooling medium into an annular space demarcated by the outer casing, the working fluid discharge pipe, and the tubular member; and a discharge port that discharges the cooling medium introduced into the annular space.

2. The axial flow turbine according to claim 1, wherein one end portion of the tubular member is fixed to the outer casing, the other end portion of the tubular member is an unfixed end, the introduction port is provided in the outer casing, and the discharge port is provided in the working fluid discharge pipe.

3. The axial flow turbine according to claim 1, wherein one end portion of the tubular member is an unfixed end, the other end portion of the tubular member is fixed to the working fluid discharge pipe, the introduction port is provided in the working fluid discharge pipe, and the discharge port is provided in the outer casing.

4. The axial flow turbine according to claim 1, wherein the tubular member includes a ridge part that projects to an outer periphery side over a circumferential direction.

5. The axial flow turbine according to claim 4, wherein the ridge part is formed at a position facing the welded joint portion.

6. The axial flow turbine according to claim 1, wherein the introduction port is, in a cross section vertical to the center axis of the tubular member, opened toward a direction different from a direction toward the center axis.

7. The axial flow turbine according to claim 1, further comprising:

a cooling medium discharge pipe coupled to the discharge port; and a flow rate regulator that is provided in the cooling medium discharge pipe and regulates a flow rate of the cooling medium.

8. An axial flow turbine, comprising:

an outer casing;

an inner casing provided inside the outer casing;

a turbine rotor provided in the inner casing so as to penetrate therethrough;

rotor blades implanted in the turbine rotor;

stationary blades supported by a support member provided on an inner side of the inner casing, the stationary blades being disposed alternately with the rotor blades in a turbine rotor axial direction;

a working fluid introduction pipe that is welded and joined to the outer casing and through which a working fluid to be introduced into the axial flow turbine flows;

a tubular sleeve that is provided inside the outer casing and the working fluid introduction pipe and guides the working fluid to be introduced into the axial flow turbine to the inside;

a tubular member provided over an outer periphery of the sleeve inside the outer casing and the working fluid introduction pipe, the tubular member covering an inner periphery side of a welded joint portion between the outer casing and the working fluid introduction pipe;

an introduction port that introduces a cooling medium into an annular space demarcated by the outer casing, the working fluid introduction pipe, and the tubular member; and a discharge port that discharges the cooling medium introduced into the annular space.

9. The axial flow turbine according to claim 8, wherein one end portion of the tubular member is fixed to the outer casing, the other end portion of the tubular member is an unfixed end, the introduction port is provided in the outer casing, and the discharge port is provided in the working fluid introduction pipe.

10. The axial flow turbine according to claim 8, wherein one end portion of the tubular member is an unfixed end, the other end portion of the tubular member is fixed to the working fluid introduction pipe, the introduction port is provided in the working fluid introduction pipe, and the discharge port is provided in the outer casing.

11. The axial flow turbine according to claim 8, wherein the tubular member includes a ridge part that projects to an outer periphery side over a circumferential direction.

12. The axial flow turbine according to claim 11, wherein the ridge part is formed at a position facing the welded joint portion.

13. The axial flow turbine according to claim 8, wherein the introduction port is, in a cross section vertical to the center axis of the tubular member, opened toward a direction different from a direction toward the center axis.

14. The axial flow turbine according to claim 8, further comprising:

a cooling medium discharge pipe coupled to the discharge port; and a flow rate regulator that is provided in the cooling medium discharge pipe and regulates a flow rate of the cooling medium.

* * * * *